(12) United States Patent
Arnold

(10) Patent No.: US 11,820,153 B2
(45) Date of Patent: Nov. 21, 2023

(54) RECOVERY SYSTEM FOR AN INKJET TYPE DISPENSER

(71) Applicant: Hewlett-Packard Development Company, L.P., Spring, TX (US)

(72) Inventor: Chris Arnold, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 387 days.

(21) Appl. No.: 17/049,488

(22) PCT Filed: Aug. 9, 2018

(86) PCT No.: PCT/US2018/046028
§ 371 (c)(1),
(2) Date: Oct. 21, 2020

(87) PCT Pub. No.: WO2020/032953
PCT Pub. Date: Feb. 13, 2020

(65) Prior Publication Data
US 2021/0245522 A1    Aug. 12, 2021

(51) Int. Cl.
*B41J 2/18*       (2006.01)
*B41J 2/175*      (2006.01)
(Continued)

(52) U.S. Cl.
CPC ............. *B41J 2/18* (2013.01); *B41J 2/17566* (2013.01); *B41J 2/17596* (2013.01); *B41J 29/38* (2013.01); *F16K 31/52* (2013.01)

(58) Field of Classification Search
CPC . B41J 2/18; B41J 2/175; B41J 2/17596; B41J 29/38; B41J 2/17566; F16K 31/52
See application file for complete search history.

(56) References Cited

U.S. PATENT DOCUMENTS

| 884,053 A   | 4/1908 | Trebert |
| 1,493,419 A | 5/1924 | Asbury  |

(Continued)

FOREIGN PATENT DOCUMENTS

| CN | 201896969    | 7/2011 |
| CN | 103282208 A  | 9/2013 |

(Continued)

OTHER PUBLICATIONS

Zhang Huiya et al. Unsteady Simulation of Cavitation Flow for High Pressure Common-Rail Fuel Injector, Aug. 2011, p. 26-29, p. 35, vol. 33( 2011) No. 2, Diesel Engine. English Abstract Only.

*Primary Examiner* — An H Do
(74) *Attorney, Agent, or Firm* — Brooks, Cameron & Huebsch, PLLC

(57) ABSTRACT

In one example, a single valve assembly having multiple bi-stable cam actuated valves each to open and close a corresponding one of multiple separate liquid flow channels. In one example, a liquid recovery system for an inkjet type dispenser includes a reservoir, an interconnect to connect to a removable container, a flow channel from the reservoir to a printhead unit and back to the reservoir and from the reservoir to the interconnect, a pump to pump ink from the reservoir along the flow channel, and a bi-stable cam actuated valve to open and close the flow channel downstream from the pump between the reservoir and the interconnect.

18 Claims, 6 Drawing Sheets

(51) Int. Cl.
*B41J 29/38* (2006.01)
*F16K 31/52* (2006.01)

(56) References Cited

U.S. PATENT DOCUMENTS

| | | | |
|---|---|---|---|
| 7,165,495 B2 | 1/2007 | Adachi | |
| 7,497,160 B2 | 3/2009 | Kumagai | |
| 7,828,408 B2 * | 11/2010 | Miyazawa | B41J 29/38 |
| | | | 347/30 |
| 8,915,186 B2 | 12/2014 | Nadachi et al. | |
| 9,694,593 B2 | 7/2017 | Kuribayashi | |
| 9,702,076 B2 | 7/2017 | Bocchino et al. | |
| 9,751,317 B2 | 9/2017 | Nakamura et al. | |
| 10,118,402 B2 * | 11/2018 | Ueda | B41J 29/38 |
| 10,532,557 B2 * | 1/2020 | Wan | B41J 2/185 |
| 11,493,030 B2 * | 11/2022 | Singh | F04B 9/04 |
| 2002/0038611 A1 | 4/2002 | Naniwa | |
| 2008/0158283 A1 | 7/2008 | Tsai et al. | |
| 2012/0200622 A1 | 8/2012 | Inoue et al. | |
| 2016/0091109 A1 | 3/2016 | Woods et al. | |
| 2018/0154649 A1 | 6/2018 | Ueda et al. | |

FOREIGN PATENT DOCUMENTS

| | | |
|---|---|---|
| CN | 203202305 | 9/2013 |
| CN | 105264282 A | 1/2016 |
| CN | 105736764 | 7/2016 |
| CN | 205745437 | 11/2016 |
| CN | 206171398 U | 5/2017 |
| CN | 206429702 | 8/2017 |
| CN | 207310858 | 5/2018 |
| EP | 1088665 | 4/2001 |
| EP | 0671274 B1 | 2/2003 |
| JP | 09-060754 A | 3/1997 |
| JP | 09112712 | 5/1997 |
| JP | 2012166363 A | 9/2012 |
| RU | 2200236 C1 | 3/2003 |
| RU | 2212633 C1 | 9/2003 |
| WO | WO-03099568 | 12/2003 |

* cited by examiner

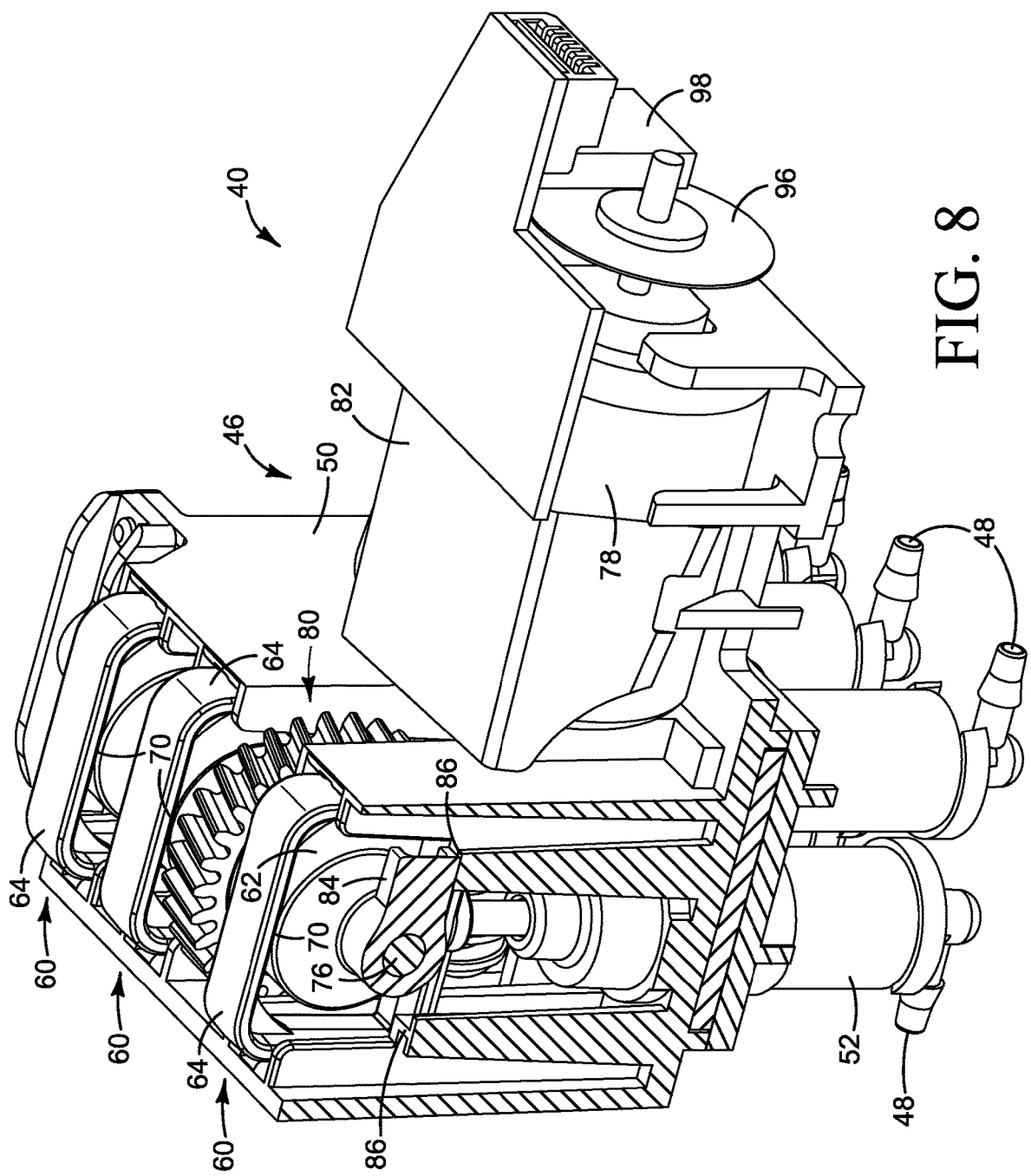

RECOVERY SYSTEM FOR AN INKJET TYPE DISPENSER

BACKGROUND

Inkjet type dispensing devices dispense liquid onto a substrate in the form of drops or streams with a printhead or an array of printheads. For example, inkjet printers dispense ink onto paper and other print substrates. For another example, some additive manufacturing machines dispense liquid fusing agents onto a powdered build material with an inkjet type dispenser. Additive manufacturing machines that use inkjet type dispensers are commonly referred to as 3D printers.

DRAWINGS

FIG. 8 is a section view along the line 8-8 in FIG. 3 corresponding to the valve open position of FIG. 6.

The same part numbers may be used to designate the same or similar parts throughout the figures.

DESCRIPTION

In some inkjet printers, the printheads are assembled in a printbar that spans a full width of the print substrate. Ink is pumped to the printbar from a permanent reservoir separate from the printbar to continuously supply the printheads with ink. The pump circulates ink from the reservoir to the printbar and back to the reservoir to carry air away from the printbar and to maintain ink pressure to the printheads during printing. When the printheads are idle, the pump may be run to circulate ink to keep ink components mixed and to continue to carry air away from the printbar. A separate reservoir, pump, and flow channel may be used for each of the different color inks, and for each of any other printing liquids that may be dispensed by the printheads. This type of ink delivery system is sometimes called a "continuous ink" system. It may be desirable in some circumstances to recover liquid from each reservoir, for example to facilitate performing maintenance on the reservoirs or other printer components and when a printer reaches the end of its useful life.

A new liquid recovery system for an inkjet printer has been developed to enable pumping liquid from each reservoir to a recovery container. A new recovery valve assembly has also been developed to facilitate the recovery process. In one example, a recovery valve assembly is implemented as a single valve assembly that includes multiple bi-stable cam actuated valves to open and close multiple separate liquid flow channels, for example to recover different color inks from the corresponding reservoirs in a continuous ink system. In one example, the valve assembly includes a single driver operatively connected to the actuator cams to open all of the channels simultaneously so that liquid may be recovered from each of multiple reservoirs simultaneously. In one example, stable open and closed valve positions is achieved by arranging the cams and cam followers with respect to one another on a single drive shaft so that each cam exerts a force on the corresponding follower along a line through the center of the shaft in both the open and closed positions.

Examples are not limited to ink, printbars or inkjet printing in general. Examples may be implemented with other printhead units, other inkjet type dispensers and for other liquids. The examples described herein illustrate but do not limit the scope of the patent, which is defined in the Claims following this Description.

As used in this document, "and/or" means one or more of the connected things; a valve "disc" means that part of a valve that allows, throttles, and/or stops flow depending on its position, whether or not it is disc shaped; and a "liquid" means a fluid not composed primarily of a gas or gases.

Figure 1:
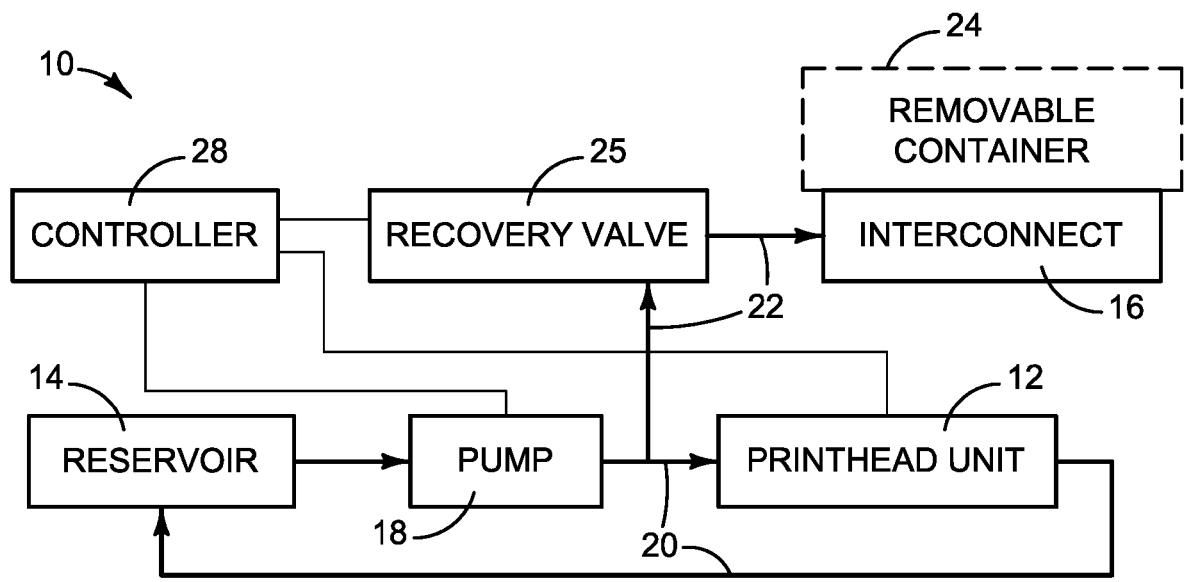
FIG. 1 is a diagram illustrating one example of a liquid delivery and recovery system for an inkjet type dispenser.

FIG. 1 is a diagram illustrating one example of a liquid delivery and recovery system 10 for an inkjet type dispenser. Referring to FIG. 1, system 10 includes a printhead unit 12, a permanent reservoir 14 separate from printhead unit 12, an interconnect 16, a pump 18, a supply flow channel 20 from reservoir 14 through printhead unit 12 and back to reservoir 14, and a recovery flow channel 22 from reservoir 14 to interconnect 16. System 10 also sometimes includes a removable liquid container 24. Removable container 24 is depicted with dashed lines in the figures to indicate a removable component that is not a permanent part of system 10.

Printhead unit 12 includes one or multiple printheads and flow structures to carry ink or other liquid to the printhead(s). A printhead unit 12 usually will also include a pressure regulator or other flow control device to help control the flow of liquid to each printhead. Although a single printhead unit 12 is shown, system 10 may include multiple printhead units 12. Printhead unit 12 may be implemented, for example, as a substrate wide printbar in an inkjet printer to dispense ink and/or other printing liquids, or as an agent dispenser in an additive manufacturing machine to dispense fusing, detailing, coloring, and/or other liquid manufacturing agents. Each of multiple liquid delivery and recovery systems 10 may be used to delivery and recover each of multiple corresponding liquids in a single inkjet type dispensing device.

System 10 also includes a recovery valve 25. During a dispensing operation, when a container 24 is not connected to interconnect 16, recovery valve 25 is closed and pump 18 pumps a liquid from reservoir 14 along supply flow channel 20 to printhead unit 12, and unused liquid back to reservoir 14, for example at the direction of a controller 28. Controller 28 represents the processing and memory resources, programming, and the electronic circuitry and components needed to control the operative components of system 10, and may include distinct control elements for individual system components. When the printhead(s) are idle, pump 18 may be run to continue to circulate liquid through printhead unit 12, for example to keep ink or other components of the liquid mixed and to carry air away from the printhead unit(s).

During a recovery operation, when a removable container 24 is connected to interconnect 16, recovery valve 25 is open and pump 18 pumps liquid from reservoir 14 along recovery flow channel 22 to container 24, for example at the direction of controller 28. In the example shown in FIG. 1, recovery flow channel 22 is coextensive with supply flow channel 20 to downstream of pump 18 where it diverges to interconnect 16. Interconnect 16 allows liquid to flow into a container 24 from flow channel 22. In one example, one or multiple flow regulators in printhead unit 12 may be configured to enable the preferential flow of liquid to a removable container 24 during a recovery operation. In another example, a pressure control device positioned in supply flow channel 20 between printhead unit 12 and reservoir 14 may be used to help enable the preferential flow of liquid to a removable container 24 during a recovery operation. Interconnect 16 may be configured to seal against the pump pressure when a container 24 is not connected to interconnect 16. Interconnect 16 may be implemented, for example, as a needle/septum seal or other suitable passive flow device to allow the flow of liquid into container 24 when a container 24 is connected to interconnect 16 and valve 25 is open.

Figure 2:
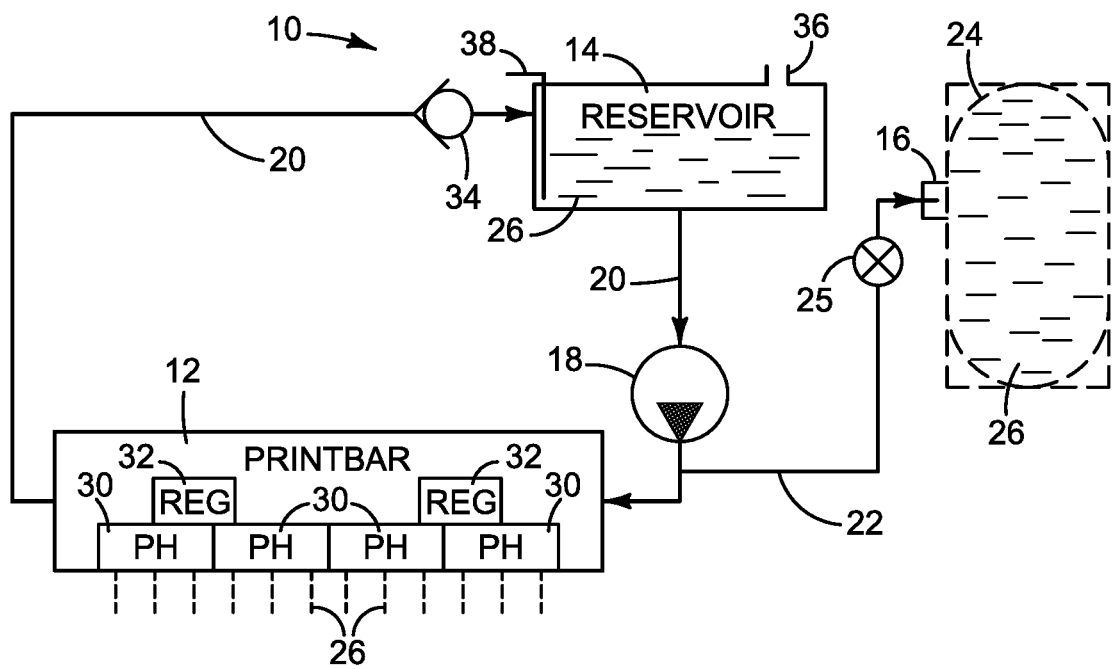
FIG. 2 is a diagram illustrating one example implementation for a liquid delivery and recovery system shown in FIG. 1.

FIG. 2 is a diagram illustrating one example implementation for a liquid delivery and recovery system 10 shown in FIG. 1. In the example shown in FIG. 2, printhead unit 12 is implemented as a printbar with multiple printheads 30 and flow regulators 32 each to regulate the flow of liquid to the corresponding printheads 30. A check valve or other suitable pressure control device 34 positioned in flow channel 20 between printbar 12 and reservoir 14 may be used to help enable the preferential flow of liquid to a removable container 24 during a recovery operation. The resistance to the flow of liquid to printhead unit 12 is greater than the resistance to the flow of liquid to interconnect 16 when valve 25 is open and a removable container 24 is connected to interconnect 16. For example, the cracking pressure of a check valve 34 in combination with any flow resistance through printbar 12 may be higher than the pressure to pump liquid 26 to a container 24 when recovery valve 25 is open. A pressure control device 34 also helps enable pump 18 to maintain positive gauge pressure at regulators 32 during normal operation when recovery valve 25 is closed. Reservoir 14 may also include a vent 36 and a liquid level sensor 38 operative connected to controller 28 (shown in FIG. 1) to monitor the amount of liquid in reservoir 14.

FIGS. 1 and 2 show example configurations for a liquid delivery and recovery system 10. Other suitable configurations may be possible. Also, while a single liquid delivery and recovery system 10 is shown in the figures, an inkjet type dispensing device may include multiple systems 10, one for each color ink in a color printer for example.

Figure 3:
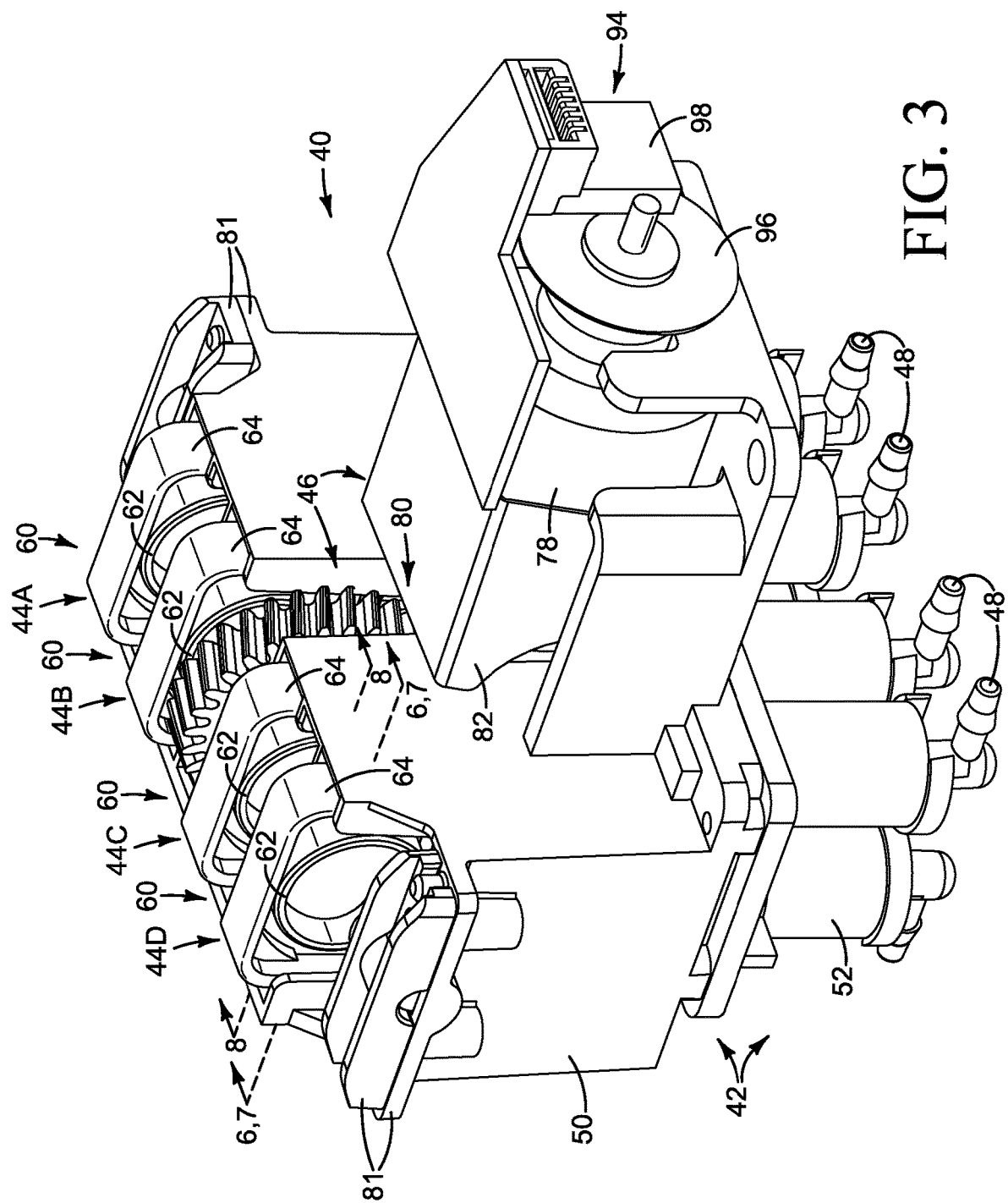
FIG. 3 is a perspective view illustrating one example of a valve assembly such as might be used to implement multiple recovery valves in a multi-channel group of liquid delivery and recovery systems for an inkjet type dispenser.
Figure 4:
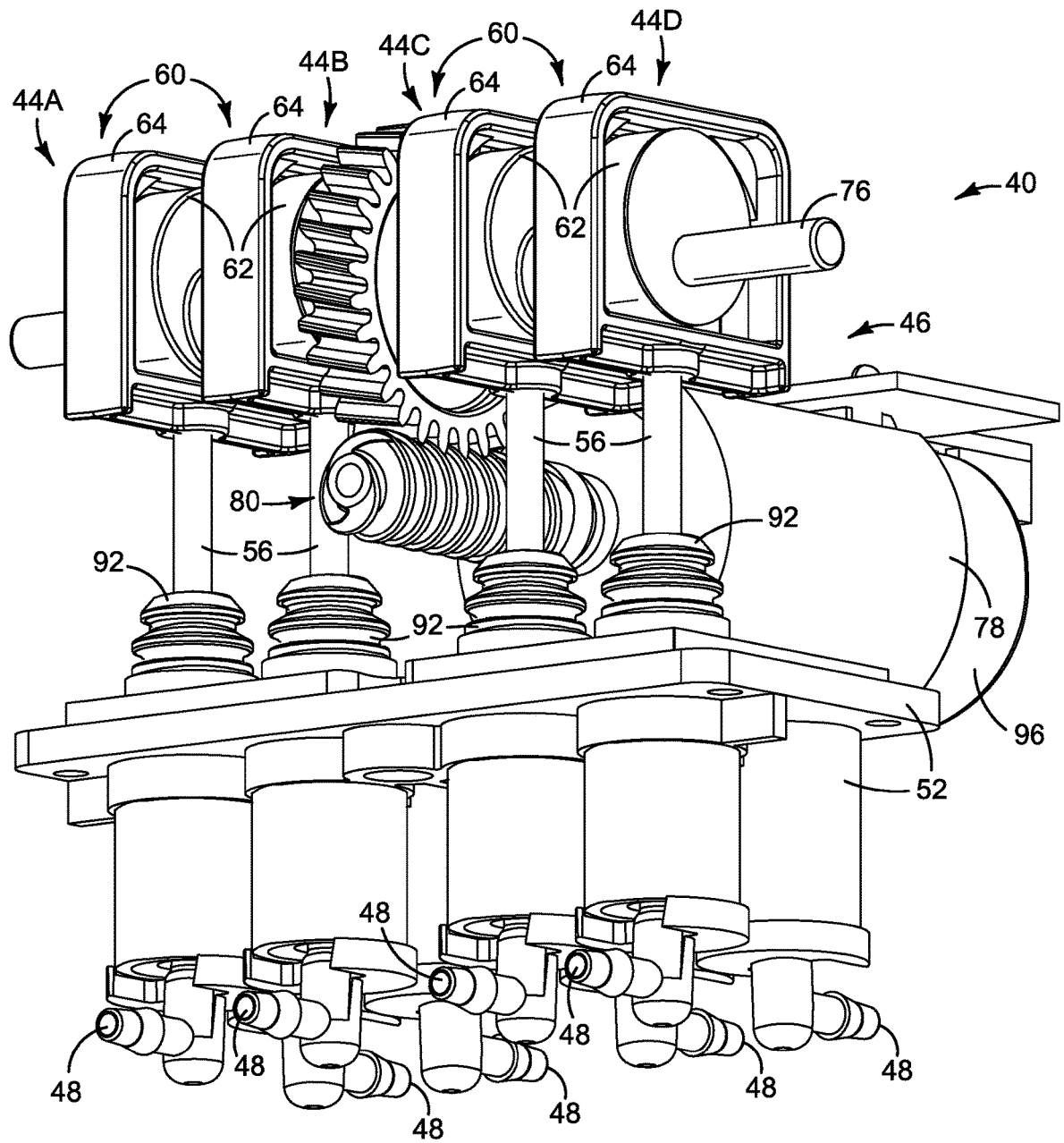
FIG. 4 shows the valve assembly of FIG. 3 with part of the body removed.
Figure 5:
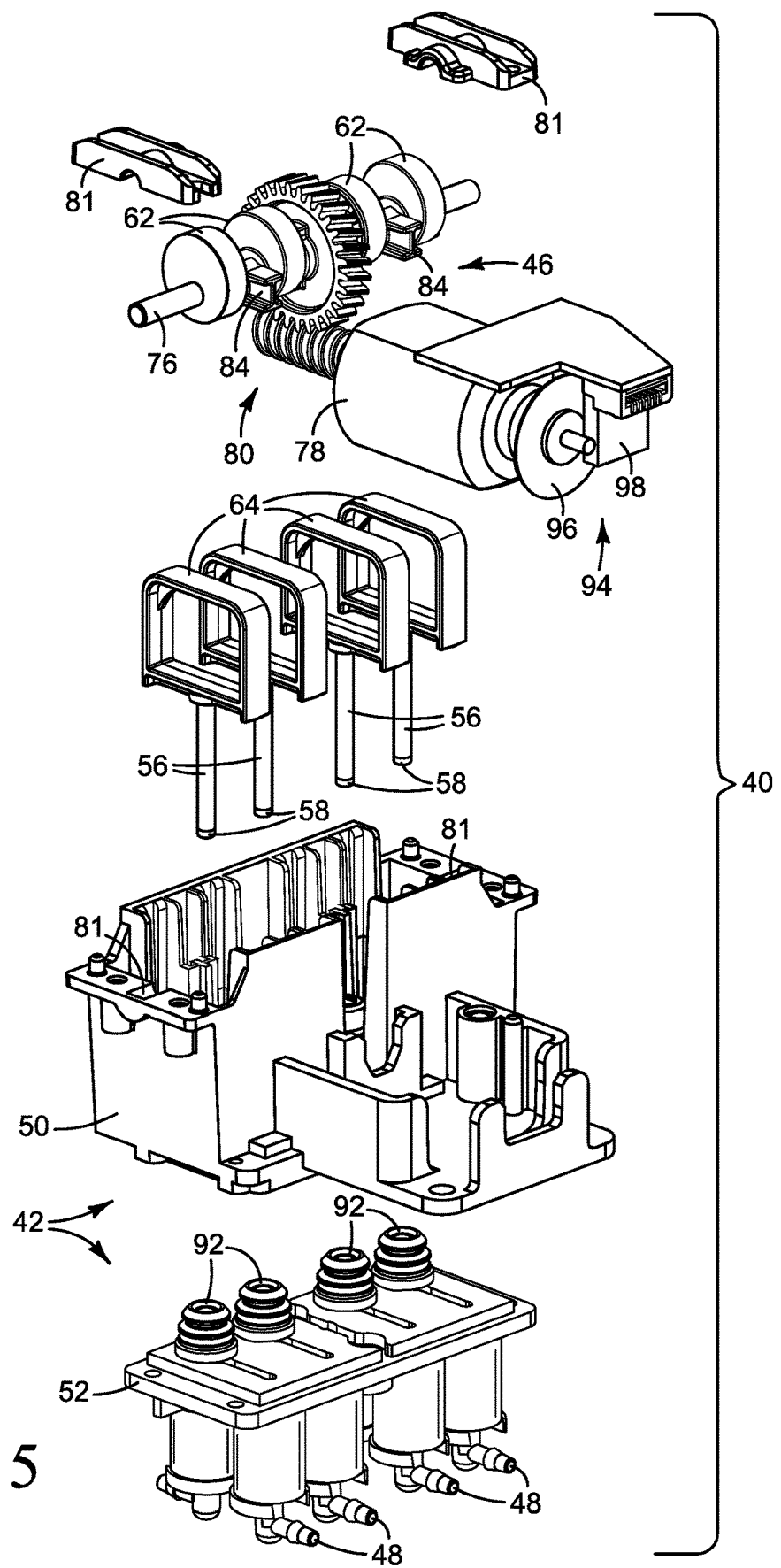
FIG. 5 is an exploded view of the valve assembly of FIG. 3.
Figure 7:
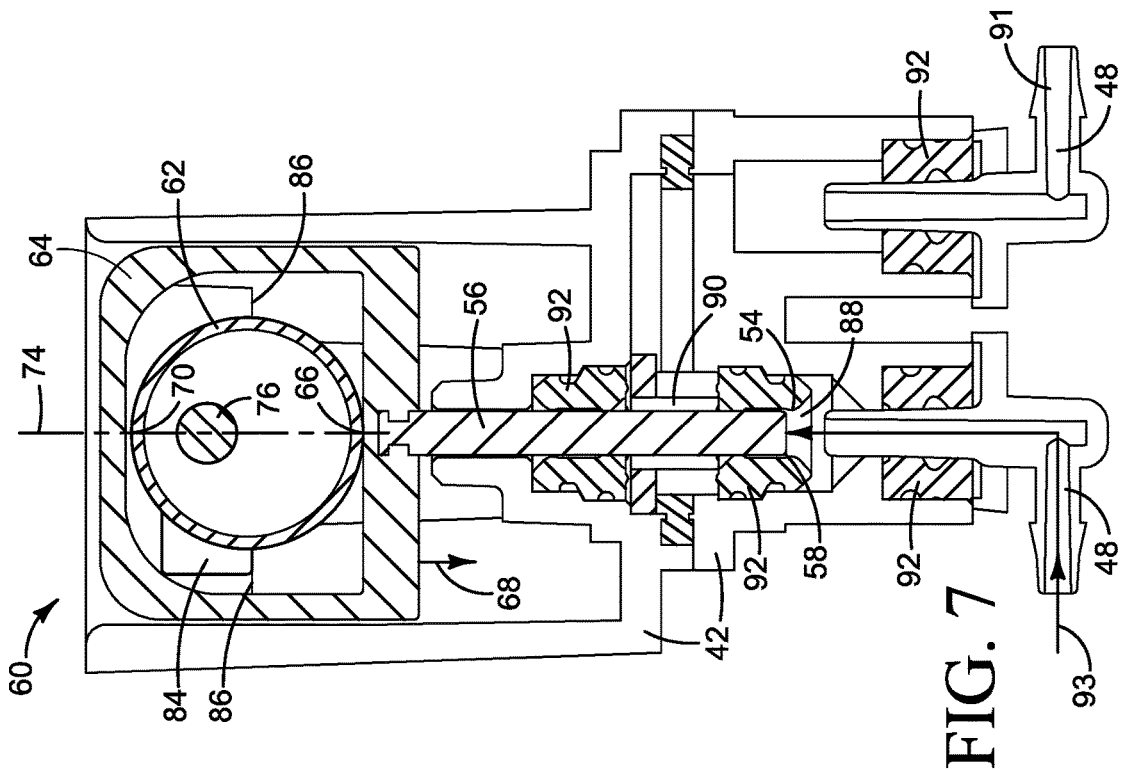
FIGS. 6 and 7 are section views taken along the line 6,7-6,7 in FIG. 3 showing one of the valves in open and closed positions, respectively.
Figure 6:
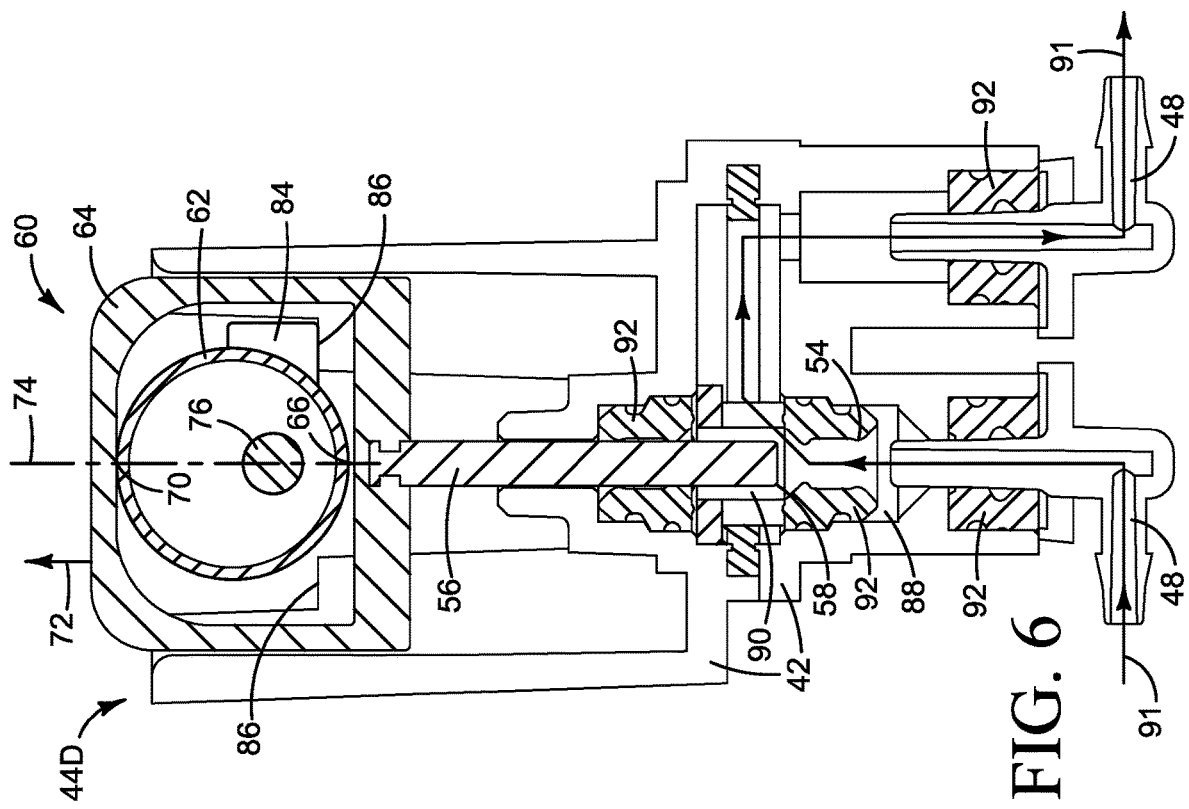

FIG. 3 is a perspective view illustrating one example of a single valve assembly 40 such as might be used to implement multiple recovery valves for multiple liquid recovery systems. FIG. 4 illustrates valve assembly 40 with part of the body removed to show interior parts. FIG. 5 is an exploded view of valve assembly 40. FIGS. 6 and 7 are section views taken along the line 6,7-6,7 in FIG. 3 showing one of the valves in open and closed positions, respectively. FIG. 8 is a section view along the line 8-8 in FIG. 3 corresponding to the valve open position of FIG. 6.

Referring to FIGS. 3-8, valve assembly 40 includes a single body 42 housing multiple valves 44A, 44B, 44C, and 44D operated by a single driver 46. Driver 46 is omitted from the section views of FIGS. 6 and 7. Each valve opens and closes one of multiple corresponding flow channels 48, as best seen in FIGS. 6 and 7. In this example, there are four flow channels and thus four valves, for example to control the recovery flow of four different color inks in a color printer. Also in this example, body 42 includes an upper body part 50 and a lower body part 52. Each valve 44A-44D includes a seat 54 in lower body part 52, a stem 56 and a disc 58 movable with stem 56 into seat 54 to close the corresponding flow channel and out of seat 54 to open the flow channel. As noted above, "disc" 58 refers to that part of the valve that allows, throttles, and/or stops flow depending on its position, whether or not it is disc shaped. Disc 58 may be integral to stem 56 or a separate part attached to or otherwise movable with stem 56.

Each valve 44A-44D also includes an actuator 60 operatively connected to stem 56 to move disc 58 into and out of seat 54. Each actuator 60 has a cam 62 and a follower 64 connected to stem 56. In this example, as shown in FIGS. 6 and 7, follower 64 includes a first contact surface 66 to engage and follow cam 62 down to move disc 58 into seat 54 in the closed position, as indicated by arrow 68 in FIG. 7, and a second contact surface 70 opposite first surface 66 to engage and follow cam 62 up to move disc 58 out of seat 54 in an open position, as indicated by arrow 72 in FIG. 6. While the motion of discs 58 is up and down in this example valve assembly 40, in other examples the motion could be side to side or another back and forth direction.

As best seen in FIGS. 6 and 7, each cam 62 and corresponding follower 64 are arranged with respect to one another so that cam 62 exerts a force on follower 64 along the centerline 74 of the cam shaft 76 in both an open position (FIG. 6) and the closed position (FIG. 7). Consequently, no force is needed to hold each valve 44A-44D in open and closed positions, and the valve will remain open or closed until cam shaft 76 is rotated. This type of valve configuration is commonly referred to as a "bi-stable" valve.

A single driver 46 operates all four valve actuators 60. Driver 46 includes a single cam shaft 76 carrying cams 62, a single motor 78 to turn cam shaft 76, and a drive train 80 operatively connecting motor 78 to cam shaft 76. Drive train 80 may be implemented as a worm drive, for example, as shown in the figures. Cam shaft 76 is supported by bearings 81 in upper body part 50. In this example, cams 62 and followers 64 are arranged with respect to one another to open all of the valves simultaneously and to close all of the valves simultaneously at the urging of driver 46. Thus, in the example shown in FIGS. 3-8, the lobe of each cam and the contact surfaces of each follower are aligned radially with the lobe of the other cams and the contact surfaces of the other followers. For this type of aligned cam/follower configuration, it may be desirable in some implementations to use a single cam and/or a single cam follower to open and close multiple valves simultaneously rather than a single cam and cam follower for each of the individual valves.

Motor 78 is attached to the upper part 50 of assembly body 42 with a bracket 82. Also in this example, driver 46 includes one or multiple stops 84 on cam shaft 76 to stop shaft 76 and thus cams 62 rotating past a stable open position and a stable closed position. The rotation of each stop 84 is blocked by a blocker 86 on upper body part 50 at locations corresponding to the engagement of cams 62 with followers 64 along centerline 74 in an open position shown in FIG. 6 and the closed position shown in FIG. 7.

Each valve 44A-44D includes an inlet port 88 and an outlet port 90 that form part of flow channel 48. When a valve is open, as shown in FIG. 6, liquid may flow through channel 22 from inlet 88 past seat 54 and disc 58 to outlet 90 as indicated by flow arrows 91. When a valve is closed, as shown in FIG. 7, disc 58 is seated in seat 54 to block flow through channel 22 from inlet 88 to outlet 90 as indicated by flow arrows 93. Each valve 44A-44D usually will include one or multiple seals to prevent leakage, for example seals 92 visible in in FIGS. 4-7.

Valve assembly 40 may include an encoder 94 operatively connected to a controller 28 (shown in FIG. 1) to control motor 78 to help correctly position the valves. Encoder 94 may be implemented, for example, as a rotary encoder that includes a wheel 96 connected to the motor shaft and a reader 98 to read indicia on wheel 96.

As noted at the beginning of this Description, the examples shown in the figures and described above illustrate but do not limit the scope of the patent, which is defined in the following Claims.

"A" and "an" as used in the Claims means one or more.

The invention claimed is:

1. A single valve assembly for an inkjet type dispenser having multiple bi-stable cam actuated valves each to open and close a corresponding one of multiple separate liquid flow channels, wherein,
    while the multiple separate liquid flow channels are open a first resistance to a flow of fluid to a printhead unit coupled to the single valve assembly is greater than a second resistance to a flow of liquid to a removable container coupled to the single valve assembly.

2. The assembly of claim 1, comprising a single driver operatively connected to an actuator cam to open all of the valves simultaneously and to close all of the valves simultaneously.

3. The assembly of claim 2, comprising an actuator having multiple cams and corresponding cam followers each to open and close a single one of the valves.

4. The assembly of claim 1, comprising multiple cams and corresponding cam followers each to open and close a single one of the valves.

5. The assembly of claim 4, wherein the cams and followers are arranged with respect to one another to open all of the valves simultaneously and to close all of the valves simultaneously.

6. The assembly of claim 4, comprising a single motor to turn all of the cams simultaneously.

7. A valve assembly for an inkjet type dispenser, comprising:
    a body;
    a flow channel through the body;
    a seat in the body;
    a movable stem mounted in the body;
    a disc movable with the stem into the seat to close the flow channel and out of the seat to open the flow channel, wherein while the flow channel is open a first resistance to a flow of liquid to a printhead unit is greater than a second resistance to a flow of liquid to a removeable container; and
    an actuator operatively connected to the stem to move the disc into and out of the seat, the actuator comprising:
        a shaft;
        a cam on the shaft; and
        a follower connected to the stem, the follower having a first surface to engage and follow the cam in a first direction to move the disc into the seat in a closed position and a second surface opposite the first surface to engage and follow the cam in a second direction opposite the first direction to move the disc out of the seat in an open position, the cam and the follower arranged with respect to one another so that the cam exerts a force on the follower along a line through a center of the shaft in both the closed and open positions.

8. The assembly of claim 7, wherein:
    the body is a single body;
    the flow channel comprises multiple separate flow channels;
    the seat comprises multiple seats each for a corresponding flow channel;
    the stem comprises multiple stems;
    the disc comprises multiple discs each movable with a corresponding one of the stems into and out of a corresponding one of the seats;
    the cam comprises multiple cams rotatable together simultaneously on a single shaft; and
    the follower comprises multiple followers each connected to a corresponding one of the stems and each to follow a corresponding one of the cams.

9. The assembly of claim 8, wherein the cams and followers are arranged with respected to one another to open all of the separate flow channels simultaneously and to close all of the separate flow channels simultaneously.

10. The assembly of claim 8, including a single motor to turn the shaft.

11. The assembly of claim 7, including:
    a first stop to stop the cam rotating past the closed position; and
    a second stop to stop the cam rotating past an open position.

12. A liquid recovery system for an inkjet type dispenser, comprising:
    a reservoir;
    an interconnect to connect to a removable container;
    a flow channel from the reservoir to a printhead unit and back to the reservoir and from the reservoir to the interconnect;
    a pump to pump ink from the reservoir along the flow channel; and
    a bi-stable cam actuated valve to open and close the flow channel downstream from the pump between the reservoir and the interconnect, wherein,
    while the flow channel is open a first resistance to a flow of liquid to the printhead unit is greater than a second resistance to a flow of liquid to the removable container.

13. The system of claim 12, comprising a pressure control device to inhibit the flow of liquid to the printhead unit so that the first resistance is greater than the second resistance.

14. The system of claim 12, wherein the valve comprises:
    a body;
    a seat in the body;
    a movable stem mounted in the body;
    a disc movable with the stem into the seat to close the flow channel and out of the seat to open the flow channel; and
    an actuator operatively connected to the stem to move the disc into and out of the seat, the actuator comprising:
        a shaft;
        a cam on the shaft; and
        a follower connected to the stem, the follower having a first surface to engage and follow the cam in a first direction to move the disc into the seat in a closed position and a second surface opposite the first surface to engage and follow the cam in a second direction opposite the first direction to move the disc out of the seat in an open position, the cam and the follower arranged with respect to one another so that the cam exerts a force on the follower along a line through a center of the shaft in both the closed and open positions.

15. A liquid recovery system for an inkjet type dispenser, comprising:
  multiple separate reservoirs;
  multiple separate interconnects each to connect to a corresponding removable container;
  multiple separate flow channels each from a corresponding reservoir to a printhead unit and back to the corresponding reservoir and from the corresponding reservoir to a corresponding interconnect;
  a pump to pump ink from each reservoir along the corresponding flow channel; and
  a single bi-stable cam actuated valve assembly to open and close each flow channel downstream from the pump between the reservoir and interconnect, wherein, while the multiple separate flow channels are open a first resistance to a flow of fluid to the printhead unit is greater than a second resistance to a flow of liquid to the corresponding removable container.

16. The system of claim 15, where the pump comprises multiple pumps each to pump ink from a corresponding reservoir along the corresponding flow channel.

17. The system of claim 15, wherein the valve assembly comprises:
  a single body defining a part of each flow channel from the reservoir to the interconnect;
  multiple seats in the body;
  multiple movable stems mounted in the body;
  multiple discs each movable with one of the stems into a corresponding seat to close the flow channel and out of the seat to open the flow channel; and
  an actuator operatively connected to the stems to move the discs into and out of the seats, the actuator comprising:
    a single shaft mounted in the body;
    multiple cams on the shaft; and
    a follower connected to each stem, the follower having a first surface to engage and follow a corresponding one of the cams in a first direction to move each disc into a seat in a closed position and a second surface opposite the first surface to engage and follow the corresponding cam in a second direction opposite the first direction to move each disc out of a seat in an open position, the cams and the followers arranged with respect to one another so that each cam exerts a force on the corresponding follower along a line through a center of the shaft in both the closed and open positions.

18. The system of claim 17, comprising a single motor to turn the shaft.

* * * * *